(12) United States Patent
Weber (10) Patent No.: US 8,643,851 B2
(45) Date of Patent: Feb. 4, 2014

(54) SCANNING DEVICE

(75) Inventor: Guenther Weber, Gross Nemerow (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 279 days.

(21) Appl. No.: 12/973,360

(22) Filed: Dec. 20, 2010

(65) Prior Publication Data

US 2011/0154969 A1   Jun. 30, 2011

(30) Foreign Application Priority Data

Dec. 21, 2009   (DE) .......................... 10 2009 059 855

(51) Int. Cl.
    *G01B 11/14*   (2006.01)
(52) U.S. Cl.
    USPC ............................ 356/625; 356/601; 356/615
(58) Field of Classification Search
    USPC .................................................. 356/601–625
    See application file for complete search history.

(56) References Cited

U.S. PATENT DOCUMENTS

| | | | |
|---|---|---|---|
| 4,557,019 A | 12/1985 | Van Devanter et al. | |
| 4,905,512 A | 3/1990 | Hayashi | |
| 4,983,043 A * | 1/1991 | Harding | 356/606 |
| 5,028,799 A | 7/1991 | Chen et al. | |
| 5,117,717 A | 6/1992 | Mally | |
| 5,184,733 A | 2/1993 | Amarson et al. | |
| 5,481,466 A | 1/1996 | Carey | |
| 5,555,090 A | 9/1996 | Schmutz | |
| 5,745,237 A * | 4/1998 | Yahiro et al. | 356/615 |
| 6,104,482 A * | 8/2000 | Brower et al. | 356/239.4 |
| 6,407,818 B1 | 6/2002 | Whitehouse | |
| 6,882,434 B1 | 4/2005 | Sandberg et al. | |
| 7,450,247 B2 * | 11/2008 | Sandberg et al. | 356/601 |
| 7,860,277 B2 * | 12/2010 | Mulder et al. | 382/110 |
| 2006/0109485 A1 | 5/2006 | Laemmel | |
| 2007/0090189 A1 | 4/2007 | Suwa et al. | |
| 2009/0032102 A1 * | 2/2009 | Chen et al. | 136/259 |
| 2009/0095047 A1 | 4/2009 | Patel et al. | |

FOREIGN PATENT DOCUMENTS

| | | |
|---|---|---|
| DE | 33 37 251 A1 | 4/1985 |
| DE | 38 05 455 A1 | 8/1989 |
| DE | 40 01 298 A1 | 7/1991 |

(Continued)

OTHER PUBLICATIONS

Budzynski, Von Edgar, et al., "3D digitizing of freeform surfaces using a laser," VDZ-Z, vol. 132, No. 7, pp. 49-52, (1990).

*Primary Examiner* — Tarifur Chowdhury
*Assistant Examiner* — Isiaka Akanbi
(74) *Attorney, Agent, or Firm* — Kilpatrick Townsend & Stockton LLP (57) ABSTRACT

The present invention relates to a scanning device for determining at least partial cross-sectional profiles of food products to be sliced in accordance with the light cutting process, having at least one illumination device for generating a light line on the surface of a product and having at least one detection device for taking images of the product surface including the light line, wherein the illumination device includes at least one light source which is configured to generate a light beam propagating in the direction of a scanning region for the product in a scanning plane and widening in so doing and includes an optically effective device which is arranged in the propagation path of the widening light beam and which is configured to counter the divergence of at least some of the incident light.

21 Claims, 5 Drawing Sheets

(56) References Cited

FOREIGN PATENT DOCUMENTS

| | | |
|---|---|---|
| DE | 40 37 383 A1 | 5/1992 |
| DE | 43 01 538 A1 | 7/1994 |
| DE | 237 894 A5 | 8/1994 |
| DE | 695 11 099 T2 | 10/1995 |
| DE | 196 04 254 A1 | 8/1997 |
| DE | 197 41 730 A1 | 4/1999 |
| DE | 198 20 058 A1 | 12/1999 |
| DE | 10 2004 057 092 A1 | 6/2006 |
| EP | 0 227 701 B1 | 3/1992 |
| EP | 1 046 478 A1 | 4/1999 |
| EP | 1 044 770 A1 | 4/2000 |
| EP | 1 178 878 B1 | 2/2002 |
| EP | 2 101 144 A1 | 9/2008 |
| JP | 58-143204 A | 8/1983 |
| JP | 1-132333 A | 5/1989 |
| JP | 7-184534 A | 7/1995 |
| JP | 9-29693 A | 2/1997 |
| JP | 11-230728 A | 8/1999 |
| WO | WO 91/06439 A1 | 6/1991 |
| WO | WO 93/22114 A1 | 11/1993 |
| WO | WO 99/06796 A1 | 2/1999 |
| WO | WO 99/47885 A2 | 2/1999 |
| WO | WO 00/62683 A1 | 10/2000 |
| WO | WO 2005/022079 A1 | 3/2005 |

\* cited by examiner

SCANNING DEVICE

This application claims priority to German Application No. 10 2009 059 855.3, filed Dec. 21, 2009, the disclosure of which is incorporated herein by reference.

The invention relates to a scanning device for determining at least partial cross-sectional profiles of food products to be sliced in accordance with the light-cutting process having at least one illumination device for generating a light line on the surface of a product and having at least one detection device for taking images of the product surface including the light line, wherein the illumination device includes at least one light source which is configured to generate a light beam propagating in the direction of a scanning region for the product into a scanning plane and widening in this process.

The invention additionally relates to an apparatus for slicing food products, in particular to a high-performance slicer, having a product feed which is configured to feed at least one product to be sliced to a cutting plane in which at least one cutting blade moves, in particular in a rotating and/or orbiting manner, and having at least one scanning device in accordance with the invention.

Scanning devices of the initially named kind are generally known and serve to determine cross-sectional profiles of food products to be sliced in accordance with the light-cutting process. In this respect, the scanning device can be integrated into a slicing apparatus, with a spatially separate arrangement of the scanning device, however, also being able to be considered. The scanning device can in particular be operated as a stand-alone unit. The profile data determined using the scanning device can be used at a later time in the further processing of the scanned product.

The light source in particular includes a laser, in particular a line laser. To generate the widening, i.e. divergent, laser beam, the light source can moreover include suitable optical means, e.g. in the form of a plurality of lenses and/or prisms which will not be looked at in any more detail here, since the generation of light lines or laser lines is generally known per se. The possibility must still be mentioned of generating a light line in that a light beam, e.g. of a laser, is deflected sufficiently fast by means of a movable deflection unit, in particular a rotating mirror, so that the fast-moving light point or light spot can be perceived as a line. Light generated in this manner is also to be considered a widening light beam within the framework of this disclosure.

The determination of the cross-sectional profiles can serve in practice to determine the respective cross-sectional surface of the product. This will be looked at in more detail in the following. This is, however, not compulsory. The cross-sectional profiles determined using the scanning device can generally also be used for other purposes. It is furthermore not compulsory that the scanning device carries out an "all-round" scan, i.e. determines a 360° profile. It is thus, for example, also possible to determine the cross-sectional profile of only the upper side or of the lower side of the product.

As is stated in more detail in the following, cutting apparatus of the initially named kind which are also simply called slicers are generally known. Slices are, for example, cut from food products at a constant cutting frequency using circular blades which orbit in a planetary manner and additionally rotate or using only rotating scythe-like blades which have speeds of several hundred up to some thousand revolutions per minute. In practice, it is important that either the individual slices or portions formed from a plurality of slices have a preset weight. Since the cutting frequency is constant, the weight of the individual slices is preferably influenced in that the thickness of the slices is varied and this takes place by a corresponding control of the product feed: the further the product is advanced beyond the cutting plane between two cuts of the blade following one another, the greater the thickness of the product slice subsequently cut off. The slice thickness is only one parameter which determines the weight of the respective slice. The slice weight is determined by the slice volume and the average density of the slice, with the slice volume resulting from the slice thickness and the outer surface contour of the slice.

An apparatus is known from WO 99/06796 A1 for slicing a food product, e.g. a meat product, into individual slices of presettable weight (page 1, paragraph 2; page 16, lines 1-1-6).

In the respect, the yield of the product on the slicing should be maximized and the loss or waste should be minimized (page 1, lines 12-14).

The respective food product which has an irregular surface profile is conducted on a transport belt over a weighing station for weight determination and for determining its surface profile by a scanning device, with the respective peripheral contour being detected transversely to the transport direction at presettable intervals in the scanning device. The signals of the scanning device are fed to a microprocessor control unit which calculates and stores the cross-sectional area and the cross-sectional contours at the preset intervals (page 12, lines 2-18).

The volume is calculated from the stored values and the density of the food product is determined by dividing the total weight by the volume (page 15, lines 25-32).

The volume, weight, density and the three-dimensional peripheral contour of the food products are stored in a memory of the microprocessor control unit and can then be supplied from the microprocessor to a processing apparatus for the food product. The stored data for each food product or for each meat product can thus, for example, be supplied to a slicing apparatus so that the meat product can be sliced into slices of preset weight, with the cutting apparatus being able to determine the thickness of each slice from the stored data to obtain slices of preset weight (page 15, line 33, to page 16, line 6).

The scanning device for determining the peripheral contour of the respective product in this respect preferably comprises one or more ultrasound scanning heads pivotable about the product. Alternatively, the use of laser scanners or other suitable scanners is proposed (page 17, lines 10-13).

Comparable apparatus and processes are also described in WO 99/47885 A2 as well as in DE 198 20 058 A1.

A method and an apparatus are known from DE 196 04 254 A1 for acquiring weight-constant portions or slices from sliced food products of irregular shape, with the good product yield being said equally to be increased as in the case of WO 99/06796 A1 (page 1, lines 24 and 25).

For this purpose, the outer surface contour of the respective food product is in turn determined before the slicing and the mass of a product piece enclosed by this outer surface contour is directly calculated from the outer surface contour. The slice thickness can be set in dependence on the outer contour by a corresponding change in the advance on the slicing so that the slice masses or the slice weights of a portion differ less greatly (page 1, lines 40-42; page 1, line 67, to page 2, line 1).

In this case, a plurality of line projection lasers and a plurality of associated taking devices in the form of cameras which are arranged at a defined angle to the laser are provided in a scanning device for detecting the total outer surface contour (page 3, lines 37-41; page 4, lines 56-61). The respective camera in this respect observes the course of the projected laser line and a processor connected to the cameras calculates the cross-sectional surface of a potential product slice from the obtained signals (page 31, lines 49-54). The scanning device consequently works according to the so-called light-cutting process.

The slice thickness is varied via the control system of the slicing apparatus in dependence on the size of the respective cross-sectional surface.

An automatic system is known from EP 1 178 878 B1, which goes back to WO 00/62983 A1 for processing a product on the basis of the detection of its surface profile having a conveyor belt along which the product is conducted in order between a scanning device and a product processing device, wherein the scanning device has line lasers above and beneath the product for illuminating the surface profile of the product and cameras for imaging the surface profile determined by the line lasers. In this respect, each line laser is adapted to illuminate the surface profile of the product over a plane transverse to the conveying direction of the product and a control device is connected to the cameras to determine the volume of the product by detecting and processing a plurality of visual images which are detected by the cameras along the length of the product during the passage of the product through the scanning device, wherein the control device is arranged so that it has carried out the processing of these virtual images before the product is processed in the product processing device and the product processing device has a control system to vary its processing procedures at the product in part on the basis of the volume of the product.

This system differs from the apparatus in accordance with WO 99/06796 A1 in that instead of a scanning arrangement having moving sensors which are configured for distance measurement, a scanning arrangement is used having line projection lasers or line lasers having associated cameras such as is known for the same purpose from DE 196 04 254 A1.

To the extent that the actual procedure is mentioned at all in the utilization of the determined contour data or profile data, the known apparatus share the feature that first the total volume of the product is calculated from the contour data or profile data and the average product density is calculated from this—using the likewise measured total product weight.

The above-explained idea of using the measured cross-sectional profiles inter alia to determine the volume of the respective scanned product in that the corresponding cross-sectional surface of the product is respectively determined from the profile data only represents one possibility of utilizing the profile data. The determination of the product volume from the profile data is not compulsory. Reference is made in this respect, for example, to the applicant's German patent application 10 2009 036 683 which was filed on Aug. 7, 2009 and has not yet been published and which describes a technical teaching according to which the cross-sectional surfaces are admittedly determined from the profile data, but the cross-sectional surfaces are not used for the volume calculation. The determination of cross-sectional surfaces from the profile data is likewise not compulsory per se. It is thus possible, for example, to determine the product density in another manner or to use a preset value for the product density. The profile information can in this case be used only to feed the product in the respectively desired manner during the slicing procedure.

The term "contour" is also used instead of the term "profile". These terms are intended to mean the same within the framework of the present disclosure.

It is important in practice to generate the light line over the total extent of the respective product surface to be scanned at a sufficient intensity and sharpness so that an evaluation of the respective part of the surface profile is possible at all or is possible at least with a sufficient accuracy in the images taken by means of the detection device. If the product to be scanned is, for example, an exactly parallelepiped-shaped object whose flat sides face the light source, a light line satisfying the demands can be generated without problem over the total width of the respective product side.

Real food products to be sliced are, however, not of exactly parallelepiped shape, but rather have a more or less irregular surface contour. The products in particular do not have any distinct edges so that—viewed in cross-section rounded marginal regions are present. If, for example, the light source is arranged centrally beneath such a product to be scanned, a light line which can be evaluated with sufficient accuracy can admittedly be generated in a central region of the lower product side. In the rounded marginal regions, in contrast, the light line no longer satisfies the explained demands.

As already mentioned above in the discussion of the prior art, it is possible in such a situation to arrange a plurality of light sources around the product which each generate a light line on the product. If light sources are arranged beneath, above and to the side of the product, a light line can in this way be generated in total on the product surface which runs around the total product and which can be evaluated using a suitable number of suitably arranged detection devices, with e.g. a separate detection device being associated with each light source. The light lines will as a rule overlap in this process, which is generally not a problem since such an overlap brings about a rather advantageous intensity increase.

This procedure, that is the use of a plurality of light sources arranged distributed around the product to be scanned, is, however, disadvantageous to the extent that an exact alignment of the light sources is necessary so that it is ensured that the individual light lines of the light sources also actually combine to a single light line on the product surface. An offset of the light lines on the product surface transversely to the scanning plane would namely have the result that at least one detection device detects two separate light lines at least sectionally over the product surface, which makes an unambiguous determination of the cross-sectional profile impossible or at least makes the evaluation substantially more difficult.

It is therefore the object of the invention to provide a scanning device of the initially named kind with which a light line can be generated on the product surface as simply as possible with as little effort as possible, said light line in particular satisfying the demands with respect to intensity and sharpness over a region of the product surface which is as large as possible and in particular has an irregular course.

This object is satisfied by the features of claim 1.

Provision is in particular made in accordance with the invention that an optically effective device is arranged in the propagation path of the widening light beam and is configured to counter the divergence of at least some of the incident light.

The line generation can be improved in that the divergence of the light is countered in accordance with the invention. It can in particular be achieved that the directions from which the light is incident on the product surface change with respect to a solely straight-line light propagation by an influencing of the straight-line light propagation.

As regards the effect of the optically effective device, it already starts from a light source which generates a light beam which propagates in the direction of a scanning region for the product in a scanning plane and widens in so doing. The optically effective device serves to counter this widening of the light beam. In other words, the optically effective device does not generate the scanning plane, but is rather effective in the scanning plane.

The optically effective device in accordance with the invention can thus be configured so that the divergence of the light is reduced, so that parallel light is generated or so that converging light is generated. It can hereby be achieved that that part of the light which would propagate unused past the product without the optically effective device is influenced such that this light is incident onto the product surface and thus contributes to the line generation. In addition, regions of the product surface can be illuminated by a change in direction of this light, i.e. a light line can be projected onto regions of the product surface which would not be acted on by the light source, or would only be acted on insufficiently, without an optically effective device.

An aspect of the invention therefore comprises ensuring by the optically effective device that otherwise unused light is used for the line generation, with another aspect of the invention comprising projecting a light line using the optically effective device onto regions of the product surface otherwise not illuminated or only illuminated insufficiently.

Depending on the specific embodiment of the illumination device and on the relative arrangement of the light source, the optically effective device and the product surface to be scanned, it can in particular be achieved that rounded marginal regions of the product are acted on by light influenced by the optically effective device so that a light line can be projected onto these previously critical regions of the product surface without additional light sources being necessary for this purpose.

In accordance with the invention, a light line can therefore be produced which satisfies the demands on the profile determination using only a single light source even with an unfavorable product contour and in particular over rounded marginal regions, which was previously only possible with the aid of a plurality of light sources arranged distributed in the peripheral direction. Since in accordance with the invention only a single light source is required, there is no problematic and in particular time-intensive alignment of a plurality of light sources which is required to avoid an offset of the light lines on the product surface.

As already initially mentioned, the invention does not preclude a plurality of light sources being provided for an "all-round" scanning of a product, with a respective optically effective device being associated with each of said light sources. The number of light sources required in total for determining such a "360° profile" can, however, be considerably reduced by the invention. It can namely be sufficient in many practical embodiments to provide in each case a single light source having an associated optically effective device only above the product and beneath the product in order to generate a light line on the product surface extending at least substantially about the total product.

Preferred embodiments of the invention are also set forth in the dependent claims, in the description and in the drawing.

As already mentioned above, the optically effective device can be configured to generate parallel light or convergent light. In this respect, the divergence of the incident light is therefore countered to the extent that the divergence of the light is not only reduced, but rather the incident light is influenced such that parallel light or convergent light emerges from the optically effective device.

In a possible embodiment, the optically effective device includes at least one lens or at least one prism. A system of a plurality of lenses and/or prisms can generally be provided.

In a further embodiment of the invention, the optically effective device includes at least one Fresnel lens. An advantage of Fresnel lenses comprises the fact that optical effects can be achieved with them with a relatively small spatial extent in the direction of the optical axis for which conventional spherical or aspherical lenses or lens systems would require a very large construction space in the direction of the optical axis. Fresnel lenses can in particular provide a high refractive power in extreme installation situations.

The fact that Fresnel lenses may under certain circumstances have worse imaging properties with respect to conventional "optically equivalent" lenses or lens systems can be accepted in applications in which the quality or exactness of the optical imaging is not of primary importance.

A further advantage of Fresnel lenses comprises the fact that they can be manufactured comparatively simply and inexpensively for the purpose required within the framework of the invention.

A Fresnel lens in accordance with the invention can be manufactured, for example, from plastic. The shaping of a body forming the Fresnel lens and to be further processed subsequently can take place, for example, by pressing or by milling.

The illumination device can include a plurality of light sources which each generate a light beam propagating in the direction of the scanning region in a scanning plane and widening in so doing and are arranged around the scanning region. A "360° profile" can be determined in this manner. Provision is preferably made in this respect that the scanning planes of the light sources coincide.

An optically effective device acting against the divergence of at least some of the incident light can be associated with each light source. It is furthermore possible, but not compulsory, to associate a detection device with each light source.

In an embodiment, the optically effective device is symmetrically configured or effective with respect to a center plane which extends perpendicular to the scanning plane and in which the light source lies.

Provision is made in a further embodiment of the invention that the optically effective device generates convergent light and each pair of individual rays which extend at the same angle to a line of intersection between the scanning line and the center plane, intersects at a point which lies on the line of intersection and behind a base plane extending perpendicular to the center plane. This geometry will be explained in more detail with reference to an embodiment in conjunction with the Figures.

If the base plane is defined by a product support on which the product to be scanned lies, it is ensured by this geometry that the—imaginary—intersection points of the light beams lie either within the product or—viewed from the light source—behind the product. It is hereby achieved that no point on the surface of the product is illuminated from more than one direction.

Depending on the embodiment of the optically effective device, all the individual rays can intersect at a single common point. Alternatively, the distance of the point of intersection lying on the line of intersection from the light source varies, and indeed in dependence on the spacing of the origin of the individual rays from the line of intersection. The distance is in particular the greater, the larger the spacing is.

The incident divergent light can be utilized even more effectively for generating light lines using such an optically effective device.

Provision is made in a further embodiment that at least one deflection device for the light is provided in the propagation path of the light between the product surface and the detection device. The deflection device is preferably a mirror, in particular a planar mirror. It is thus not necessary in this respect to arrange the detection device, for example a camera, so that it "looks" directly toward the light line generated on the product surface. The provision of at least one deflection device makes it possible to arrange the detection device at a particularly suitable location which is in particular given by the constructional circumstances of a higher ranking device, for example, a high-speed slicer, into which the scanning device in accordance with the invention is integrated or with which the scanning device in accordance with the invention cooperates.

It is further more proposed that a first detection device for a first side of the product and a second detection device for a second side of the product are arranged in close spatial proximity to one another, in particular directly next to one another, with the detection devices preferably facing in opposite directions.

It is hereby made possible to arrange two cameras, "looking", for example, in opposite directions, practically at the same location. Provision can be made in this respect to provide by means of one or more deflection devices that the cameras receive light from different regions of the product surface, in particular from mutually opposite product sides. One camera can thus, for example, be provided for the upper side of the product and the other camera for the lower side of the product, even though both cameras are arranged practically at the same position.

In an embodiment of the slicing apparatus in accordance with the invention, the product feed is configured to conduct the product through the scanning region of the scanning device. The scanning device is in this respect in particular integrated into the slicing apparatus such that a product to be sliced is first conveyed through the scanning device and is subsequently fed to the cutting plane of the slicing apparatus. In this respect, the scanning device can be arranged so far in front of the cutting plane—viewed in the product feed direction—that the product is completely scanned before the start of the slicing of the product.

As already mentioned above, a base plane of the scanning device can be defined by a product support of the slicing apparatus, and indeed such that all the points of intersection of the individual rays forming the convergent light coming from the optically effective device lie either within the product lying on the product support or behind the product.

Provision can be made that a first detection device for a first side of the product and a second detection device for a second side of the product are arranged in close spatial proximity to one another, in particular directly next to one another, at a point which—viewed in the product feed direction—lies behind the scanning plane and/or beneath a plane defined by a product support.

It is possible, but not compulsory that the optically effective device influences the total light originating from the light source. Provision can alternatively be made that some of the light propagates from the light source to the product uninfluenced by the optically effective device.

The invention is not restricted to the profile determination at food products to be sliced, but rather includes determining profiles and/or measuring cross-sectional surfaces of any desired objects.

The invention will be described in the following by way of example with reference to the drawing. There are shown.

A possible embodiment of a slicing apparatus in accordance with the invention is shown schematically in FIG. 1 which is simply called a slicer in the following and which includes a scanning device 17 in accordance with the invention.

The slicer includes a product feed 13 which is here provided in the form of a holding device or gripping device which engages at the rear end of the product 11 to be sliced and which is movable by means of a drive, not shown, in a product feed direction A to feed the product 11 to a cutting plane S extending perpendicular to the product feed direction A. In this cutting plane S a cutting blade 15 moves which can in particular be, for example, a circular blade orbiting in a planetary manner or rotating or a scythe-like blade only carryout out a rotation. The products 11 to be sliced lie on a product support 27 which extends parallel to the product feed direction A and defines a base plane 55 which will be looked at more closely in the following. Further drive devices for the products 11 which are not shown here can be provided in addition to the product holder 13.

A scanning device 17, which is only shown schematically here and which will also simply be called a scanner in the following, is arranged at a sufficient spacing in front of the cutting plane S. The scanner 17 serves to determine a plurality of cross-sectional surfaces of a product 11 to be sliced and running through the scanner 17 before the slicing in a scanning plane 29 which in this embodiment is fixed with respect to the cutting plane S and which likewise extends perpendicular to the product feed direction A. An already scanned product is shown only for illustration by dashed lines in FIG. 1 at which the slicing has, however, not yet started.

In the embodiment shown here, the scanner 17 works in accordance with the light cutting process and is for this purpose provided with one or more light sources 23, for example so-called line lasers, as well as one or more cameras 25. An optically effective device 47, which will be explained in more detail in the following, is arranged in the propagation path of the laser radiation between the light source 23 and the product 11.

Figure 1:
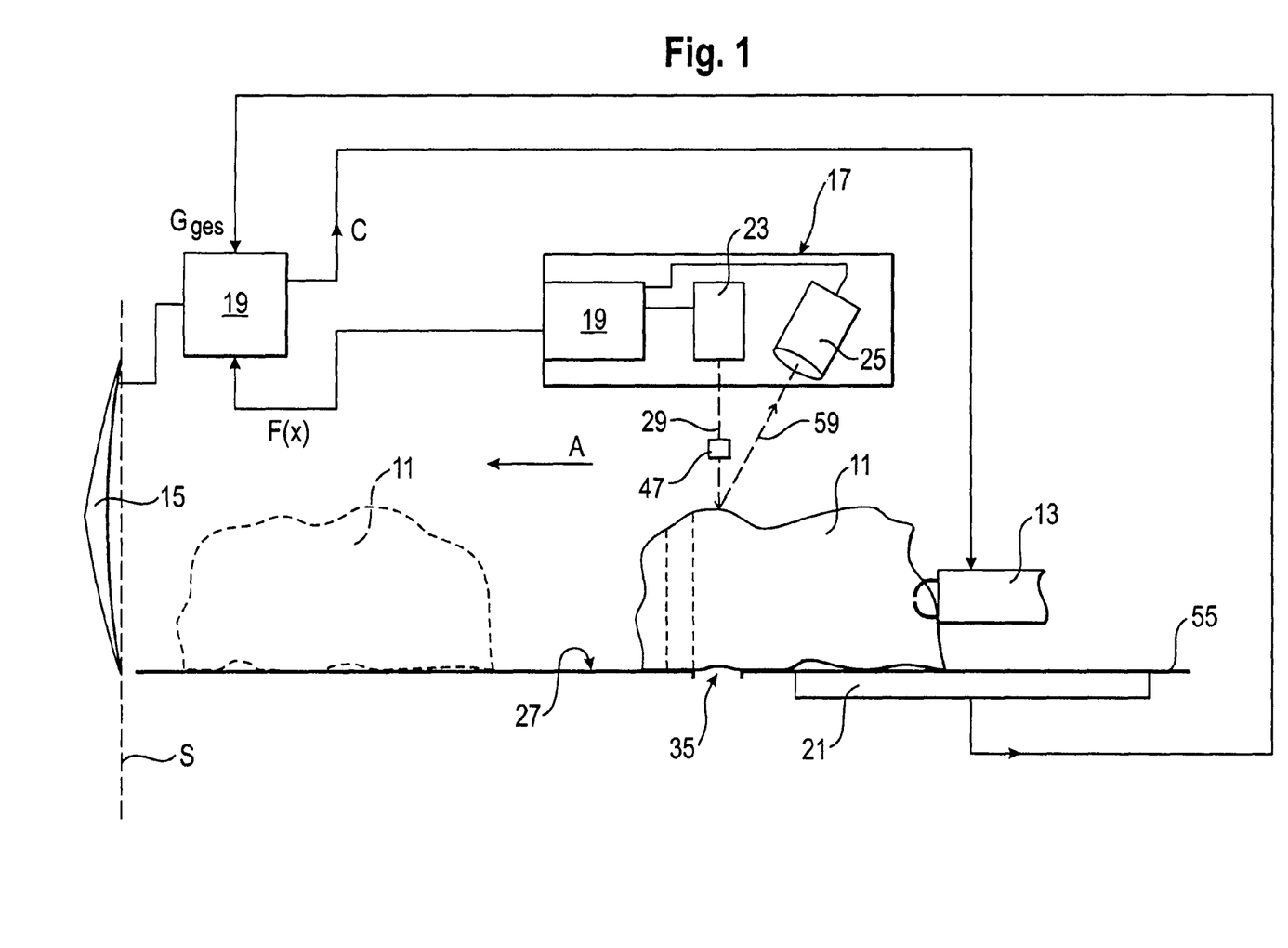
FIG. 1 schematically, a possible embodiment of a slicing apparatus in accordance with the invention with a scanning device in accordance with the invention.

Only a scanning unit arranged above the product 11 is shown in FIG. 1. The scanner 17 can alternatively or additionally have a scanning unit arranged beneath the product 11, with suitable means being provided to enable a scanning of the lower side of the product 11, for example, a gap provided at the scanning plane 29 between two mutually following endless conveyor belts forming the product support 27 at least in the region of the scanning plane 29.

The scanner 17 can generally have any desired number of scanning units arranged in the scanning plane 29 around the product 11 to scan the product 11 "all round" and thus to be able to determine "360° profiles" or the respective cross-sectional surfaces with high accuracy.

The generally known light cutting process is based on the principle of projecting a light line onto the respective surface to be examined—here the surface of the products 11 to be sliced—and of detecting this light line using a suitable detection device. On the basis of the known geometrical relationships, the contour or the profile of the surface along the light line can be determined by processing images taken with the detection device. If the surface contour has been determined in a plane around the total object in this manner, the cross-sectional surface of the object in this plane can be calculated by means of the light cutting process, for example. Since light cutting processes are in particular also known from the already initially named prior art in connection with the slicing of food products, this will not be looked at in any more detail here.

The slicer additionally includes in accordance with the embodiment of FIG. 1 a control and processing device 19 which here includes two units of which one is arranged in the scanner 17 and the other at a different point, in particular in a controller provided for operating the slicer and in particular the product feed 13. These two units can alternatively also be combined into a single unit. In the embodiment shown, the cross-sectional surfaces F(x) of the slicer unit 19 measured directly at the product 11 are supplied to the slicer unit 19 which additionally receives the total weight Gges of the product 11 which is measured by means of scales 21. The scales 21 can be a component of the scanner 17, but can generally also be arranged at another point of the slicer or before the slicer.

The measured cross-sectional surfaces F(x) transmitted to the slicer unit 19 represent a set of cross-sectional surfaces which are measured at constant intervals along the product feed direction A of the product 11. This can be achieved, for example, in that the product 11 is moved through the scanner 17 at a constant speed and the scanner 17 is operated at a constant taking frequency. The constant interval between two directly mutually following measured cross-sectional surfaces (Fx) amounts, for example, to 5 mm. This constant interval, which is also called a scan width or step size, can be changed by changing the product feed speed and/or the scanning frequency of the scanner 17 in order in this manner to change the accuracy or resolution with which the product 11 is scanned and measured with respect to its outer surface contour or its profile.

The control and processing unit 19 calculates control data C from the cross-sectional surfaces of the product 11 and its total weight Gges in order in this manner to vary the slice thickness and thus the slice weight in the respective desired manner on the slicing of the product 11 in the initially explained manner, in particular with the goal of cutting weight-constant slices or weight-constant slice portions from the product 11.

The calculation of the control data C can take place completely or partly in one of the two processing units 19, i.e. fully or partly either in the scanner 17 or fully or partly at the slicer, i.e. e.g. in the slicer control. This is at the discretion of the user.

The manner of utilization of the cross-sectional surfaces of the product and of the total product weight for determining the control data C, in particular for preparing a weight table with which work can then be carried out on the slicing or for preparing a slicing plan, is not a subject of the invention so that it will not be looked at in any more detail here.

Figure 2:
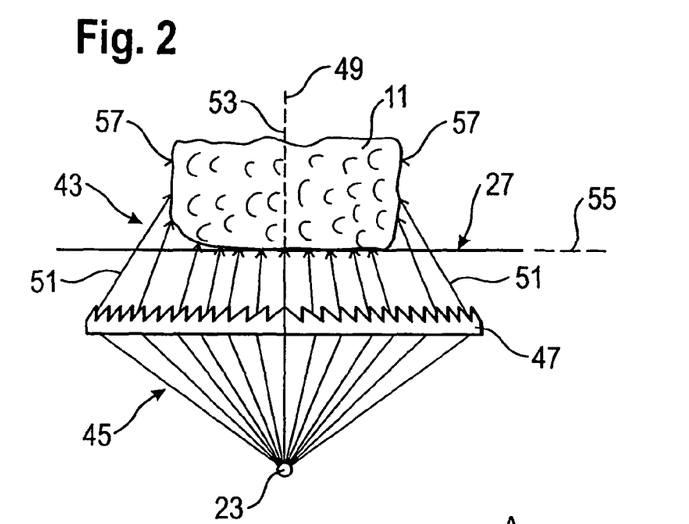
FIG. 2 a schematic view of a scanning device in accordance with the invention in a plane perpendicular to a product feed direction.
Figure 3:
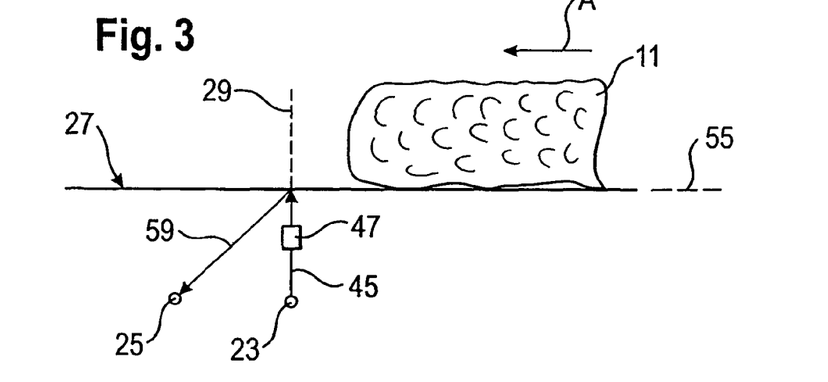
FIG. 3 schematically, a side view of a scanning device in accordance with the invention.
Figure 4:
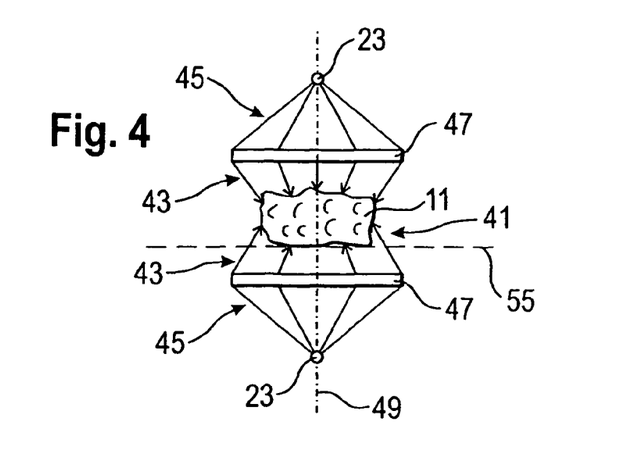
FIG. 4 schematically, a further view of a scanning device in accordance with the invention in a plane perpendicular to a product feed direction, with two illumination devices being provided.

FIGS. 2 to 4 schematically show possible embodiments of the scanning device 17, in particular with respect to the manner of the generation of the light line on the product surface.

An arrangement is shown by way of example in FIG. 2 in which only a single light source 23, for example a line laser, is arranged beneath the product 11 which lies on a product support 27 which defines a base plane 55.

The light source 23 transmits a widening, divergent light beam 45 in the direction of the lower side of the product 11, and indeed (cf. FIG. 3) in a scanning plane 29 which in this embodiment extends perpendicular to the base plane 55 and thus to a product feed direction A. This alignment of the scanning plane 29 is, however, not compulsory. The scanning plane 29 can generally extend inclined at any desired angle to the base plane 55.

The generation of the widening light beam 45 through the light source 23 can take place in that the light source 23 includes optical means—not shown here—for example, a cylinder lens which is positioned in front of a laser diode.

An optically effective device 47 which is configured as a Fresnel lens in this embodiment is arranged in the propagation path of the divergent light 45 coming from the light source 23. The Fresnel lens 47 has a bar-shaped basic shape having a relatively small extent both perpendicular to the scanning plane 29 (cf. FIG. 3) and perpendicular to the base plane 55.

The width of the Fresnel lens 47, i.e. its extent perpendicular to a center plane 49 which will be looked at in more detail below, is, in contrast, selected so large that it is larger than the width of the product 11 to be scanned. In practice, scanners and slicers are as a rule adapted so that products 11 of different widths can be scanned and sliced. The width of the Fresnel lens 47 is preferably selected such that it is larger than the maximum product width for which scanners and slicers are adapted.

The Fresnel lens 47 is configured so that it counters the divergence of the light 45 propagating from the light source 23 to the Fresnel lens such that the incident divergent light exits the Fresnel lens 47 as convergent light 43. Some individual rays 51 of the convergent light 43 are shown purely schematically in FIG. 1 merely for illustration.

It can be seen from the representation of FIG. 2 that some of the divergent light 45 originating from the light source 23 would propagate in a straight line past the product 11 without the Fresnel lens 47. An effect of the optically effective device in accordance with the invention, here the Fresnel lens 47, comprises influencing the propagation of this otherwise unused light so that it is directed to the product surface. In particular rounded marginal regions of the product 11 and even at least parts of the product sides or product flanks 57 can hereby be illuminated such that a sufficiently sharp and intensive light line is also generated there.

The optically effective device 47 in accordance with the invention consequently has the effect here that in particular the outer regions of the divergent light beam 45 is deflected inwardly, that is in the direction of a center plane 49, which extends perpendicular to the base plane 55 and in which the light source 23 lies.

The Fresnel lens 47 in accordance with FIG. 2 is in this respect configured such that the individual rays 51 of the convergent light 43 do not intersect in front of the product, but rather either within the product 11 or—viewed from the light source 23—behind the product 11.

The base plane 45 and the center plane 49 intersect along a line 53 on which the individual rays 51 of the convergent light 43 intersect. If the individual rays 51 do not all intersect at a common point on the line of intersection 53, in particular the distance of the point of intersection from the light source 23 is dependent on the spacing of the origin of the respective individual rays 51 at the Fresnel lens 47 from the line of intersection 53. In other words, the point of intersection is the further remote from the light source 23 on the line of intersection 43, the further outwardly the respective individual rays 51 pass through the Fresnel lens 47.

Whereas in the embodiment of FIG. 2, the Fresnel lens 47 generates convergent light 43, a substantial improvement can also be achieved with respect to known arrangements which do not have any optically effective device between the light source and the product surface when the optically effective device 47, for example again a Fresnel lens, is configured such that parallel light is generated from the incident divergent light 45. An improvement can also already be achieved when the light exiting the optical effective device 47 continues to diverge, but the widening or the angle of divergence is reduced with respect to the incident, divergent light 45.

FIG. 3 schematically shows the arrangement of a detection device 25, in particular of a camera not shown in FIG. 2, with which the laser line generated on the product surface is taken. The "viewing direction" of the detection device 25, i.e. a detection plane 59, is in this respect inclined at a fixed angle to the scanning plane 29 (cf. also FIG. 1). The contour or profile of the product surface can be determined along the laser line from the geometrical circumstances of the arrangement within the framework of the light cutting process from the image of the product surface including the laser line.

The laser line is therefore that line which is defined by cutting the product surface with the scanning plane 29.

FIG. 4 shows by way of example an arrangement in which a product 11 to be scanned is located in a scanning region 41 of a scanning device in accordance with the invention formed by two illumination devices.

Each illumination device includes a light source 23 and an optical device 47 in accordance with the invention, for example a Fresnel lens. The light sources 23 in this example are positioned above the product 11 and beneath the product 11 on a line of intersection 52 extending perpendicular to the base plane 45 between the center plane 49 and the base plane 45.

At least a part of the product flanks 57 can in each case also be illuminated in dependence on the design and arrangement of the light source 23 and the optically effective device 47, for which reason in accordance with the invention two light sources 23 can be sufficient to allow at least substantially an "all-round" scanning of the product 11 with a light line satisfying the demands with respect to intensity and sharpness.

Whereas in the embodiment of FIGS. 2 to 4, the Fresnel lens 47 extends over the total width so that the total light originating from the light source 23 is influenced, provision can alternatively be made that some of the light 45 propagates from the light source 23 to the product 11—undisturbed by the Fresnel lens 47. For this purpose, the Fresnel lens 47 can be interrupted, in particular in a more or less wide center region, so that the Fresnel lens comprises two outer part pieces for the outer regions of the divergent radiation 45 to act on the rounded marginal regions and, optionally, at least partly on the flanks 57 of the product 11, whereas a more or less large center region of the lower product side is illuminated directly by the light source 23 without influencing by the Fresnel lens 47.

Figure 5:
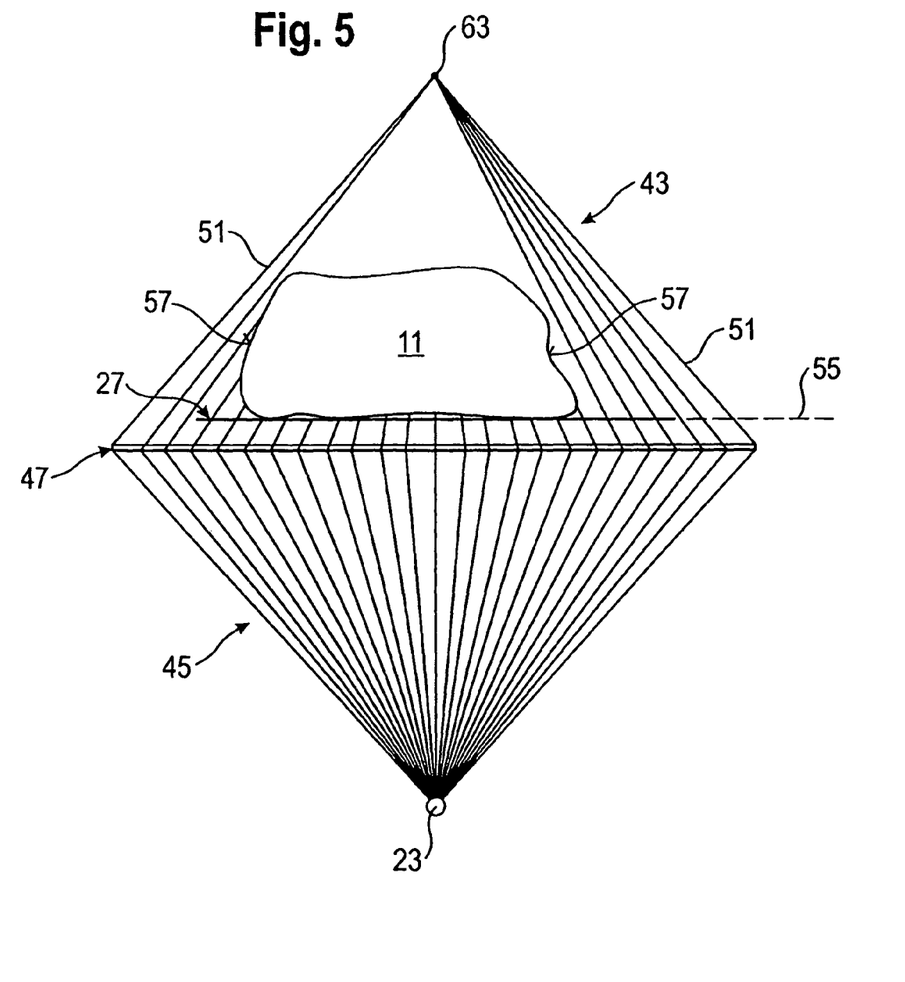
FIG. 5 a further schematic view of a scanning device in accordance with the invention in a plane perpendicular to a product feed direction.

The embodiment of FIG. 5 in particular shows the coincidence of the individual rays 51 of the convergent light 43 at a point of intersection 63 behind the product 11—viewed from the product source 23.

It can be achieved by such a generation of convergent light 43 in dependence on the specific embodiment of the Fresnel lens 47 and on the shape of the respective products 11 to be scanned that the flanks 57 of the product 11 are also reached at least in part in addition to the lower product side or—on an arrangement of the light source 23 above the product 11—the upper product side.

Figure 6:
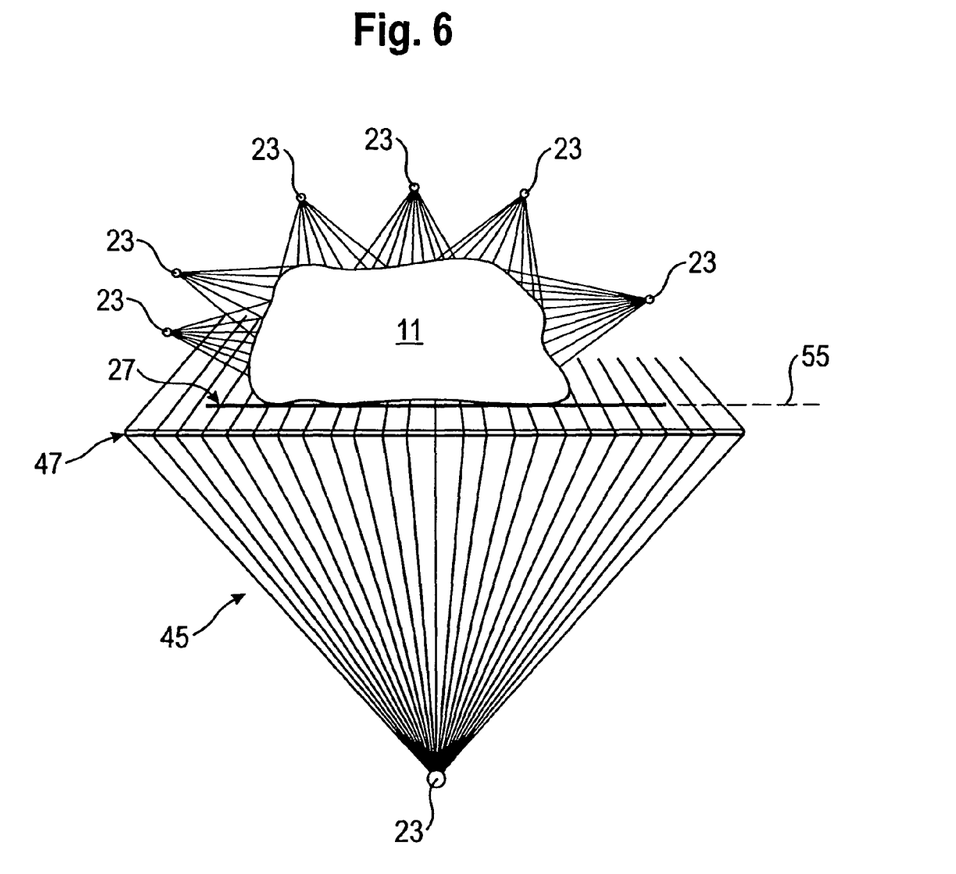
FIG. 6 a further schematic view of a scanning device in accordance with the invention in a plane perpendicular to a product feed direction with illumination devices arranged above the product.

FIG. 6 shows all the line lasers 23 arranged about the scanning region provided for a product 11 in an embodiment. Only one single light source 23, with whose divergent light the optically effective device 47 cooperates, is arranged beneath the plane 55 defined by the product support 27—as also e.g. in the embodiment of FIG. 5. Further line lasers 23 are provided above the plane 55 for illuminating the product flanks as well as the upper product side and are configured and arranged so that their scanning planes and the scanning plane of the light source 23 arranged beneath the plane 55 coincide. It can furthermore be seen from FIG. 6 that, with the product 11 shown here, the light lines mutually overlap which are generated on the product surface by the light sources 23 arranged above the plane 55.

Figure 7:
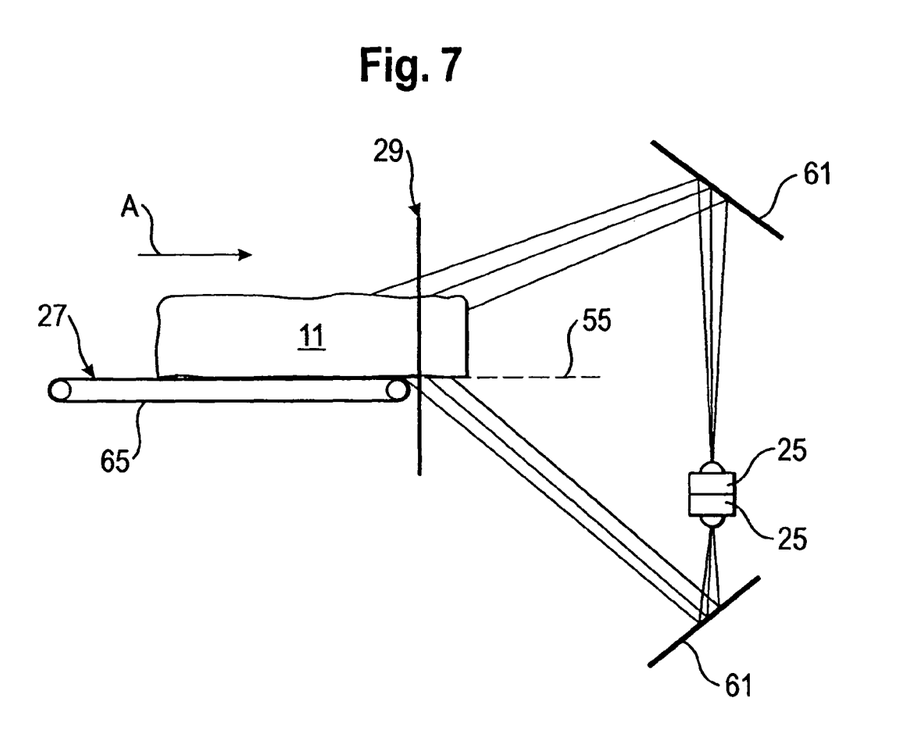
FIG. 7 schematically, a further side view of a scanning device in accordance with the invention.

A possible arrangement of two cameras 25 serving as a detection device is shown in the embodiment of FIG. 7. The cameras 25 are arranged at the same point and look in opposite directions, with the one camera 25 being provided for the upper product side and the other camera 25 being provided for the lower product side and with it in each case being provided by means of a mirror 61 that the respective camera 25 can look from its location to the respective product side.

The common camera location is selected in dependence on the construction circumstances of the respective scanning device or of the respective slicing apparatus. In the embodiment shown here, the camera location is located—viewed in the product feed direction A—behind the scanning plane 29 in which a light line which is detected by means of the cameras 25 is generated on the product surface by means of the light sources not shown here.

As mentioned at another passage, the illumination or scanning of the product 11 takes place from below through a gap provided in the product support 27. The gap can be formed by an intermediate space between two conveying devices 65 following one another, e.g. by conveyor belts, of which only the conveying device 65 disposed in front of the scanning plane 29 is shown in FIG. 7.

It must also be mentioned that the common camera location 25 is here provided beneath the plane 55 defined by the product support 27. Existing slicers make it possible to provide the required construction space for the camera 25 in this region. This advantageous arrangement is made possible by the mirrors 61 which provide that light of the light line reflected by the product surface reaches the respective camera 25. Provision is in particular made for protecting the individual components of the scanning device from contamination and form other outside influences that transparent separation devices, in particular panes of glass or plastic, are provided for the respective light used. Separation panes can thus, for example, be provided between the product 11 and the light sources 23 as well as between the product 11 and the optically effective device 47.

REFERENCE NUMERAL LIST 11 product
13 product feed
15 cutting blade
17 scanning device
19 control and processing device
21 scales
23 light source, line laser
25 detection device, camera
27 product support
29 scanning plane
35 gap
41 scanning region 43 convergent light
45 light beam, divergent light
47 optically effective device, Fresnel lens
49 center plane
51 individual ray
53 plane of intersection
55 base plane
57 product flank
59 detection plane
61 deflection device, mirror
63 point of intersection
65 conveying device
A product feed direction
C control data
F(x) measured cross-sectional surfaces
Gges total product weight
S cutting plane

The invention claimed is:

1. A scanning device for determining at least partial cross-sectional profiles of food products to be sliced in accordance with the light cutting process, comprising:
   at least one illumination device for generating a light line on the surface of a product; and
   at least one detection device for taking images of the product surface including the light line;
   wherein the illumination device includes at least one light source which is configured to generate a light beam propagating in the direction of a scanning region for the product in a scanning plane and widening in so doing, and an optically effective device which is arranged in the propagation path of the widening light beam and which is configured to counter the divergence of at least some of the incident light,
   wherein the optically effective device includes at least one Fresnel lens, and
   wherein the extent of the optically effective device is larger in the scanning plane than the corresponding extent provided as a maximum for a product to be scanned in the scanning region.

2. A scanning device in accordance with claim 1, wherein
   the optically effective device is configured to generate parallel or convergent light.

3. A scanning device in accordance with claim 1, wherein
   the optically effective device includes at least one lens and/or at least one prism.

4. A scanning device in accordance with claim 1, wherein
   the optically effective device is configured to provide an illumination also of at least a part of at least one product flank in addition to an upper side or a lower side of a product to be scanned.

5. A scanning device in accordance with claim 1, wherein
   the illumination device includes a plurality of light sources which each generate a light beam propagating in the direction of the scanning region in a scanning plane and widening in so doing and which are arranged distributed around the scanning region.

6. A scanning device in accordance with claim 5, wherein
   the scanning planes of the light sources coincide.

7. A scanning device in accordance with claim 5, wherein
   an optically effective device countering the divergence of at least some of the incident light is associated with each light source.

8. A scanning device in accordance with claim 5, wherein
   a detection device is associated with each light source.

9. A scanning device in accordance with claim 1, wherein
   the optically effective device is symmetrically effective with respect to a center plane which extends perpendicular to the scanning plane and lies in the light source.

10. A scanning device in accordance with claim 9, wherein
    the optically effective device generates convergent light and each pair of individual rays, which extend at the same angle to a line of intersection between the scanning plane and a center plane, intersects at a point which lies on the line of intersection and behind a base plane extending perpendicular to the center plane, with the distance of the point of intersection disposed on the line of intersection from the light source preferably varying in dependence on the spacing of the origin of the individual rays in the optically effective device from the line of intersection, in particular such that the distance is the larger, the larger the spacing.

11. A scanning device in accordance with claim 1, wherein
    at least one deflection device for the light, in particular a planar mirror, is provided in the propagation path of the light between the product surface and the detection device.

12. A scanning device in accordance with claim 1, wherein
    a first detection device for a first side of the product and a second detection device for a second side of the product are arranged in close spatial proximity to one another.

13. A scanning device in accordance with claim 12, wherein
    the first detection device and the second detection device are arranged directly next to one another, with the detection devices preferably facing in opposite directions.

14. A scanning device in accordance with claim 13, wherein
    the first detection device and the second detection device are arranged directly next to one another facing in opposite directions.

15. A scanning device in accordance with claim 12, wherein
    at least one deflection device for the light is provided for each of the detection devices in the propagation path of the light between the respective product surface and the detection device.

16. A scanning device in accordance with claim 15, wherein
    only one said deflection device is provided.

17. A scanning device in accordance with claim 15, wherein
    said deflection device is a planar mirror.

18. An apparatus for slicing food products, in particular a high-performance slicer, comprising:
    a product feed which is configured to feed at least one product to be sliced to a cutting plane S in which at least one cutting blade moves, in particular in at least one of a rotating and an orbiting manner; and at least one scanning device for determining at least partial cross-sectional profiles of food products to be sliced in accordance with the light cutting process, the scanning device comprising at least one illumination device for generating a light line on the surface of a product and at least one detection device for taking images of the product surface including the light line, wherein the illumination device includes at least one light source which is configured to generate a light beam propagating in the direction of a scanning region for the product in a scanning plane and widening in so doing, and an optically effective device including at least one Fresnel lens which is arranged in the propagation path of the widening light beam and which is configured to counter the divergence of at least some of the incident light wherein the extent of the optically effective device is larger in the scanning plane than the corresponding extent provided as a maximum for a product to be scanned in the scanning region.

19. An apparatus in accordance with claim 18, wherein
the product feed is configured to conduct the product through the scanning region of the scanning device, with the scanning device preferably being arranged so far in front of the cutting plane S—viewed in the product feed direction A—that the product is completely scanned before the start of the slicing of the product.

20. An apparatus in accordance with claim 18, wherein
a product support on which the product lies defines a plane which coincides with a base plane of the scanning device,
wherein the base plane is defined in that the optically effective device of the scanning device is symmetrically effective with respect to a center plane which extends perpendicular to the scanning plane and in which the light source lies; and in that the optically effective device generates convergent light and each pair of individual rays which extend at the same angle to a line of intersection between the scanning plane and the center plane intersect at a point which lies on the line of intersection and behind the base plane extending perpendicular to the center plane.

21. An apparatus in accordance with claim 18, wherein
a first detection device for a first side of the product and a second detection device for a second side of the product are arranged in close spatial proximity to one another at a location which is,—when viewed in the product feed direction A—at least one of behind the scanning plane and beneath a plane defined by a product support.

* * * * *